(12) United States Patent
Odish

(10) Patent No.: US 10,094,167 B2
(45) Date of Patent: Oct. 9, 2018

(54) TOOL FOR PLACEMENT OF MARKINGS

(71) Applicant: Rody Nowel Odish, El Cajon, CA (US)

(72) Inventor: Rody Nowel Odish, El Cajon, CA (US)

( * ) Notice: Subject to any disclaimer, the term of this patent is extended or adjusted under 35 U.S.C. 154(b) by 193 days.

(21) Appl. No.: 15/296,196

(22) Filed: Oct. 18, 2016

(65) Prior Publication Data

US 2017/0328128 A1     Nov. 16, 2017

Related U.S. Application Data

(60) Provisional application No. 62/333,830, filed on May 10, 2016.

(51) Int. Cl.
| | |
|---|---|
| *E04F 21/04* | (2006.01) |
| *E06B 9/266* | (2006.01) |
| *G01C 9/28* | (2006.01) |
| *E04F 21/00* | (2006.01) |

(52) U.S. Cl.
CPC .............. *E06B 9/266* (2013.01); *E04F 21/00* (2013.01); *G01C 9/28* (2013.01)

(58) Field of Classification Search
CPC ........................................................ B43L 7/033
USPC ..................................... 33/194, 451, 474, 482
See application file for complete search history.

(56) References Cited

U.S. PATENT DOCUMENTS

| | | | | |
|---|---|---|---|---|
| 2,473,639 A | * | 6/1949 | Erickson | E04F 21/003 24/11 P |
| 2,728,993 A | | 1/1956 | Meyer | |
| 3,080,658 A | * | 3/1963 | Pignone | B43L 7/027 33/474 |
| 3,816,933 A | | 6/1974 | Dillinger | |
| 4,503,624 A | * | 3/1985 | Whiteford | G01C 9/28 33/379 |
| 5,179,787 A | | 1/1993 | Ostrowski | |
| 5,749,153 A | * | 5/1998 | Viens | B26B 29/06 33/42 |
| 5,832,618 A | * | 11/1998 | Scarborough | G01C 9/28 33/451 |
| D432,928 S | | 10/2000 | Garrett | |
| 6,289,594 B1 | * | 9/2001 | Wrobbel | B43L 7/02 33/42 |
| 6,341,427 B1 | * | 1/2002 | Tepley | B27F 7/00 33/194 |
| 6,931,735 B1 | | 8/2005 | Clark | |
| 7,254,899 B2 | | 8/2007 | Marocco | |
| D561,620 S | | 2/2008 | Rogell | |
| 8,096,056 B1 | | 1/2012 | Murdock | |
| 2002/0053142 A1 | * | 5/2002 | Brunetti | B25H 7/00 33/194 |
| 2003/0131486 A1 | * | 7/2003 | Wallace | B25H 7/00 33/194 |
| 2009/0013546 A1 | * | 1/2009 | Keller | B25H 7/00 33/451 |

(Continued)

FOREIGN PATENT DOCUMENTS

EP          1122509 A2     8/2001

*Primary Examiner* — G. Bradley Bennett
(74) *Attorney, Agent, or Firm* — Michael D. Eisenberg

(57) ABSTRACT

A tool for placement of markings that provides a method of installing window shades and window blinds easily, accurately, and in a manner that saves time and energy. The tool for placement of markings presents novel structures and features that allow for easy, fast and accurate installation of blinds and shades.

19 Claims, 4 Drawing Sheets

(56) References Cited

U.S. PATENT DOCUMENTS

2015/0096179 A1* 4/2015 Courtney ................ B25H 7/04
  33/194
2015/0168120 A1* 6/2015 Cupertino ................ G01B 3/30
  33/194

* cited by examiner

TOOL FOR PLACEMENT OF MARKINGS

CROSS REFERENCES TO RELATED APPLICATIONS

The present non-provisional patent application claims priority to provisional application 62/333,830 that was filed on May 10, 2016 via the applicant, Rody Odish.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of installing window blinds, window shades, and curtains easily, quickly and with acute accuracy, more specifically, a tool designed to make the process of installation quicker and easier.

SUMMARY OF INVENTION

A function of the Precision Corner is to provide a method of installing window shades and window blinds easily, accurately, and in a manner that saves time and energy. The Precision Corner presents novel structures and features that allow for easy, fast and accurate installation of blinds and shades. With the Precision Corner, installing window blinds and shades can be accomplished easily and efficiently by any user, regardless of the user's experience level, without resorting to other complicated measuring tools or processes.

These together with additional objects, features and advantages of the tool for placement of markings will be readily apparent to those of ordinary skill in the art upon reading the following detailed description of the presently preferred, but nonetheless illustrative, embodiments when taken in conjunction with the accompanying drawings.

In this respect, before explaining the current embodiments of the tool for placement of markings in detail, it is to be understood that the tool for placement of markings is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tool for placement of markings.

It is therefore important that the claims be regarded as including such equivalent construction insofar as they do not depart from the spirit and scope of the tool for placement of markings. It is also to be understood that the phraseology and terminology employed herein are for purposes of description and should not be regarded as limiting.

BRIEF DESCRIPTION OF DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top", "bottom" or "side" views, such references are merely descriptive and do not imply or require that the invention be implemented or used in a particular spatial orientation unless explicitly stated otherwise.

Figure 1:
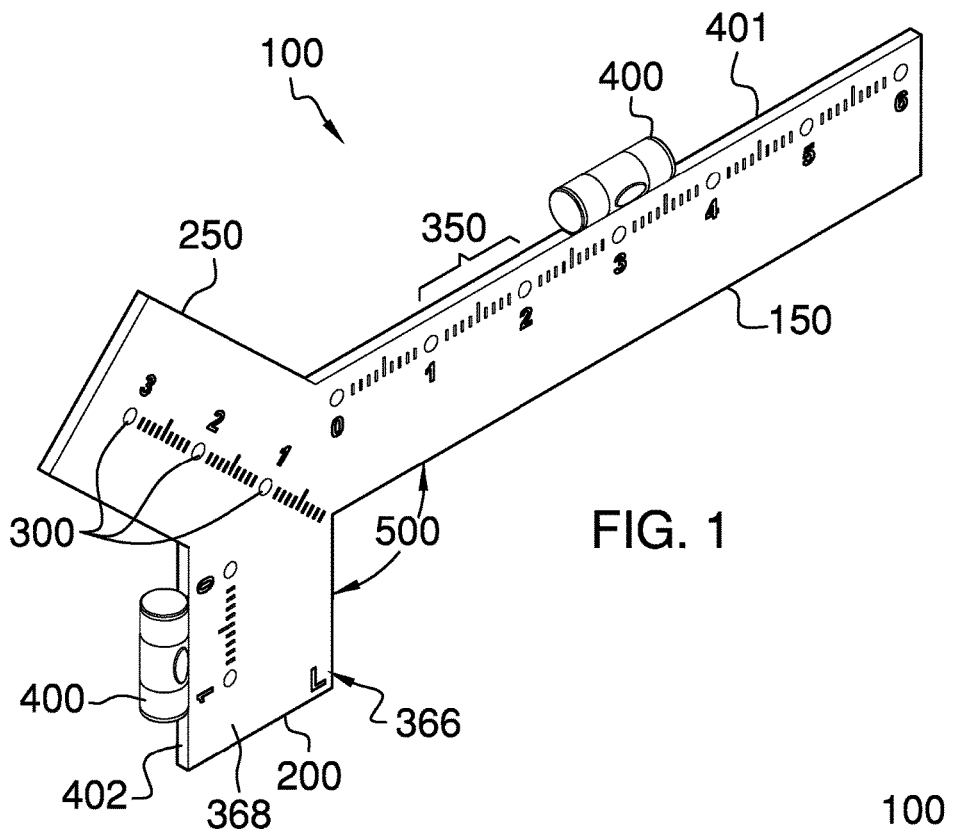
FIG. 1 is a perspective view of an embodiment of the disclosure.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8. The tool for placement of markings 100 (hereinafter invention) is constructed with a Y-shaped configuration, measuring 8 inches high, 6 inches long, and 1 inch wide, with three legs of different lengths meeting together in a Y-shaped head, with one long leg 150 that intersects with one short leg 200 at a 90-degree angle 500, and with one medium-length leg 250, which meets both the short leg 200 and the long leg 150 at a 45-degree angle 450 and protrudes outward diagonally.

The long leg 150 is measured at 6 inches in length, and the short leg 200 is measured at 1 inch in length, and the medium-length leg 250 is measured at 2 inches in length.

Figure 2:
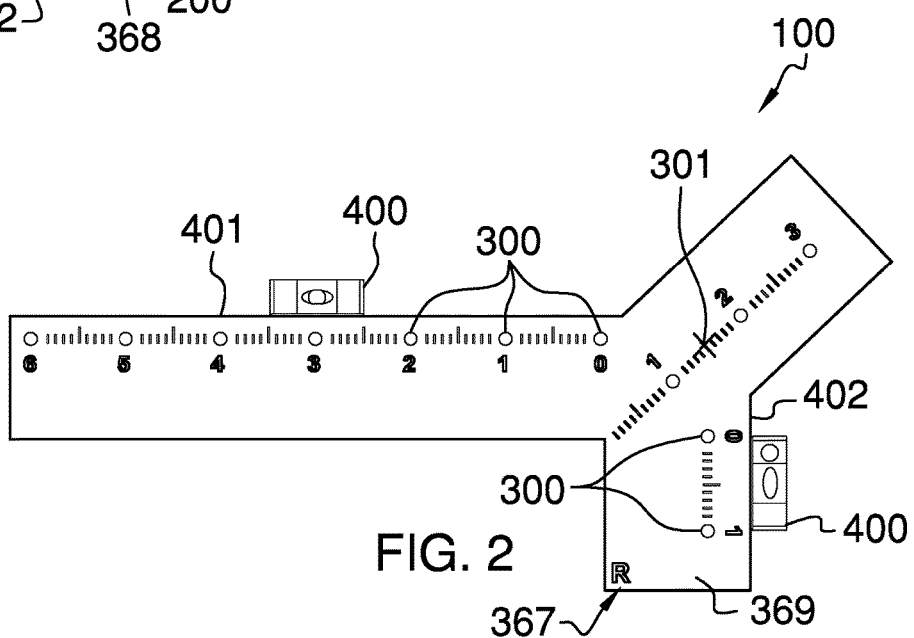
FIG. 2 is a front view of an embodiment of the disclosure.
Figure 3:
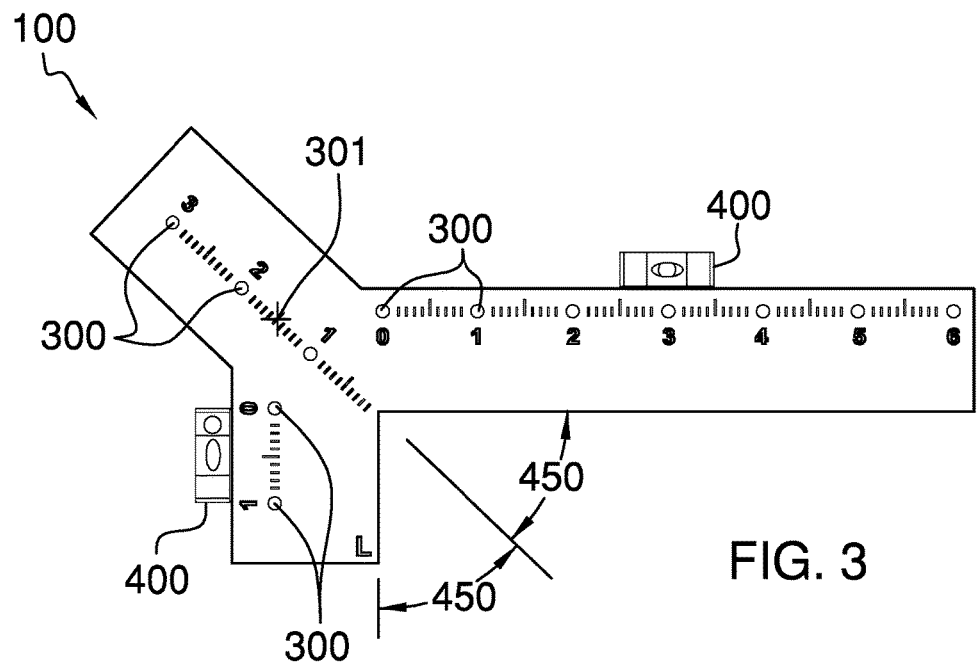
FIG. 3 is a rear view of an embodiment of the disclosure.
Figure 4:
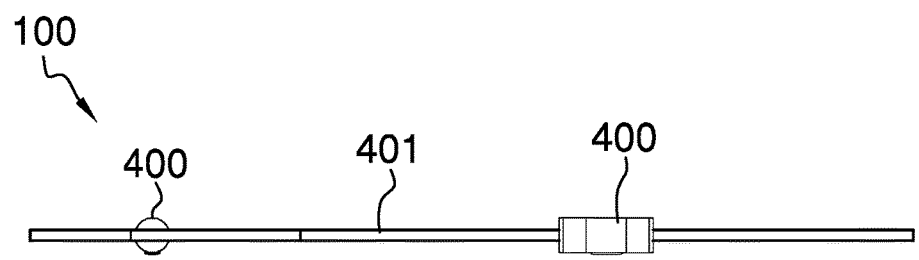
FIG. 4 is a top view of an embodiment of the disclosure.

Each of the three legs forming the Y-shaped configuration contains holes 300 to allow for ease of marking measurements, which holes 300 are evenly spaced apart. For example, the holes 300 are separated an 1-inch apart. Moreover, the holes 300 are configured in a straight line starting at a center 301 of the Y-shaped head and continuing along the length of each leg in fixed increments, for example, 1-inch increments. The holes are spaced apart from the edge of the leg, at a predetermined distance, for example 1 inch, or 0.5 inch or 0.25 inch. Although FIG. 1 shows one row of holes in each leg, other embodiments may have multiple rows of holes with a different spacing. For example one set of holes are spaced 0.25 inches from the edge and in 0.25-inch increments along a line. For example, FIG. 2 illustrates two sets of holes, one set spaced apart inch from the edge and 1 inch hole to hole. A second set is spaced apart 0.5 inch from the edge and 0.5 inch hole to hole.

Each of the three legs forming the Y-shaped configuration contains ruler lines 350 numbered at every inch, such that each hole 300 is placed at each numbered inch mark, and which ruler lines are configured in a straight line starting at the center 301 of the Y-shaped head and continuing along the length of each leg.

Two glass bubble levels 400 (hereinafter levels) are affixed to the legs of the Precision Corner, one of the levels 400 is affixed to the long leg 150 such that the one of the levels 400 is situated on a right exterior side 401 of the long leg 150 when the Precision Corner is arranged vertically and faced forward. One of the levels 400 is affixed to the short leg 200 such that the one of the levels 400 is situated on an exterior top 402 of the short leg 200 when the Precision Corner is arranged vertically and faced forward.

According to another embodiment of the invention 100, the Precision Corner comprises the invention 100 is shaped in a Y-shaped configuration, with one long leg 150 measuring 6 inches, and one short leg 200 measuring 3 inches, for installation of blinds and shades on small windows and doors.

According to yet another embodiment of the invention 100 is in another Y-shaped configuration with one long leg 150 measuring 12 inches, and one short leg 200 measuring 3 inches, for installation of blinds and shades on medium-sized windows and doors.

According to yet another embodiment of the invention 100 in another Y-shaped configuration with one long leg 150 measuring 24 inches, and one short leg 200 measuring 4 inches, for installation of blinds and shades on large windows and doors.

According to yet another embodiment of the invention 100 ub another Y-shaped configuration, with holes 300 lining the length of each leg in evenly spaced increments of ½ inch.

According to yet another embodiment of the invention 100, the invention 100 is produced from plastic.

According to yet another embodiment of the invention 100, the invention 100 is produced from glass.

According to yet another embodiment of the invention 100, the invention 100 is produced from metal such as a stainless steel.

According to yet another embodiment of the invention 100, the invention 100 is designed in a variety of colors.

Figure 5:
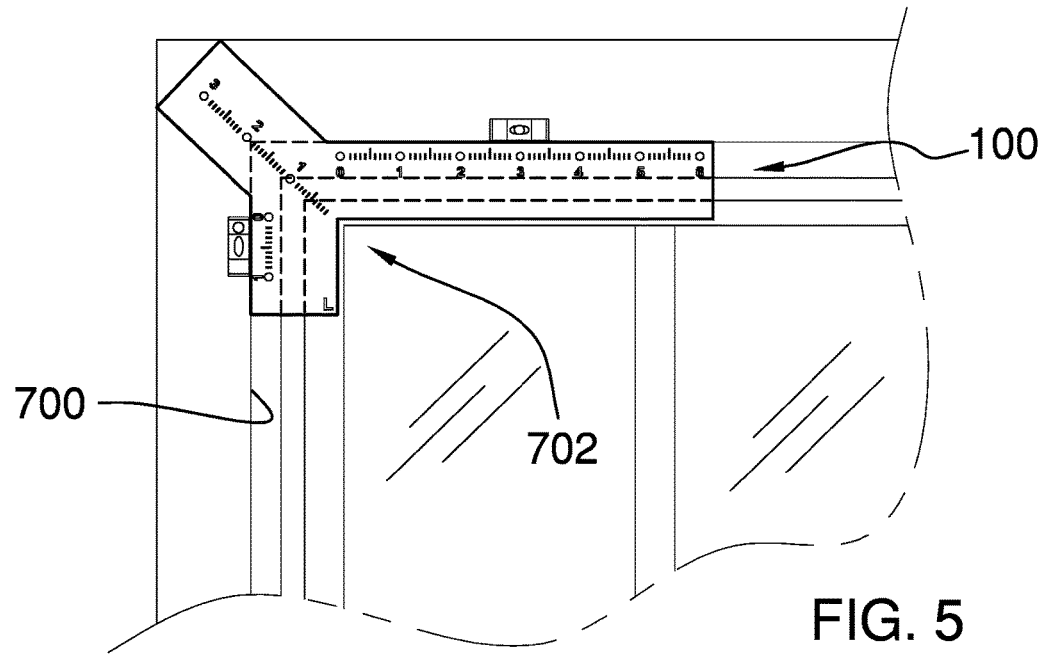
FIG. 5 is a perspective view of an embodiment of the disclosure aligned with a corner of a window frame.
Figure 6:
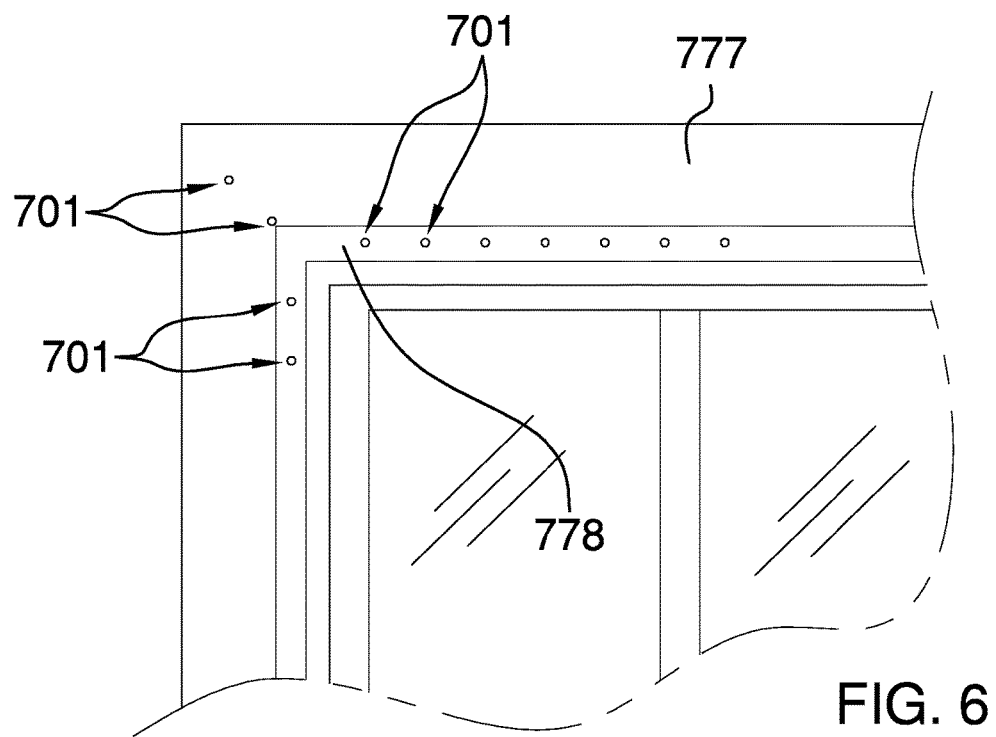
FIG. 6 is a perspective view of a window frame with markings made thereon via an embodiment of the disclosure.

Referring to FIG. 5, the invention 100 is adapted to be positioned against a frame 700 in order to enable an end user to place markings 701 thereon. The markings 701 being subsequently used in installing hardware to support blinds, drapes, etc. It shall be noted that the term frame 700 is being used to loosely refer to window frames as well as door frames. It shall be noted that the invention 100 is versatile in use, and can be used with other frames aside of doors and windows. The markings 701 are to be positioned on an outside edge 777 or an inside edge 778 of the frame 700.

It shall be noted that the short leg 200 includes an "L" marking 366 and an "R" marking 367. The "L" marking is provided on a first surface 368 of the invention 100. Moreover, the "R" marking 367 is provided on a second surface 369 of the invention 100. The "L" marking 366 is used to designate left, and implies use of the invention 100 with a left corner 702 of the frame 700. Obviously, the "R" marking 367 is used to designate right, and implies use of the invention with a right corner (not depicted).

Figure 7:
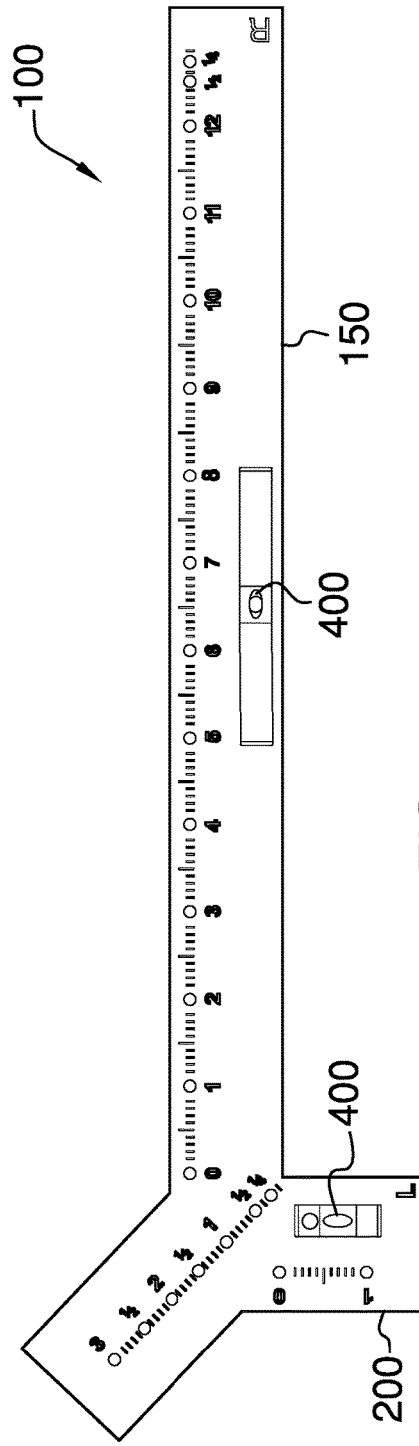
FIG. 7 is a view of an alternative embodiment of the disclosure.
Figure 8:
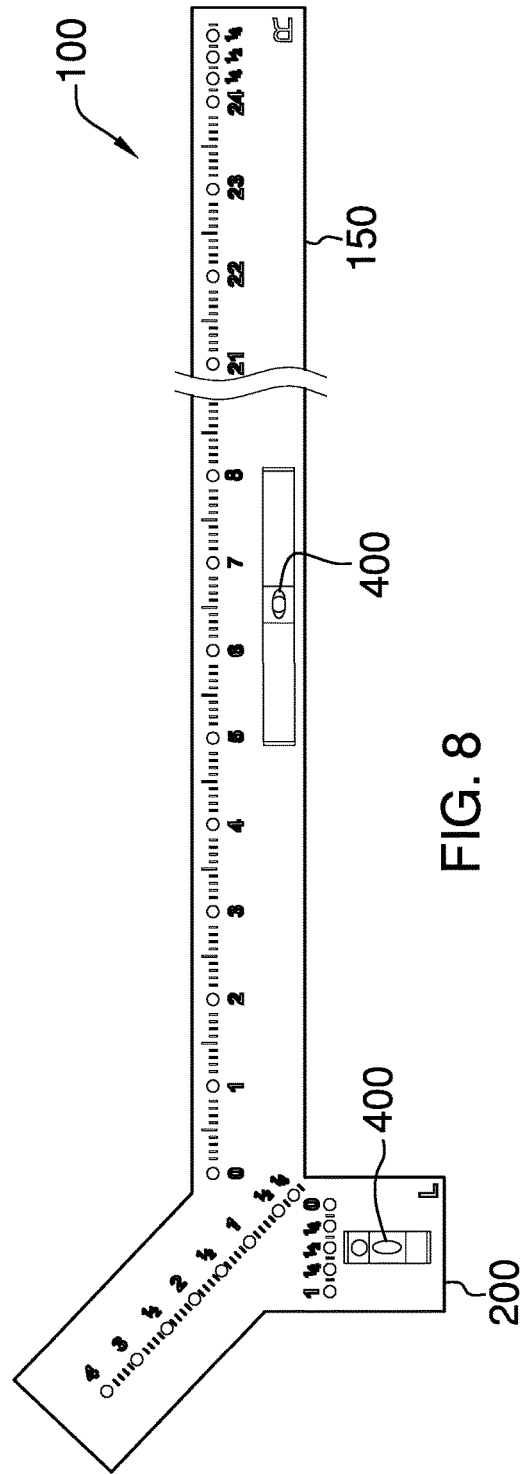
FIG. 8 is another view of an alternative embodiment of the disclosure.

FIGS. 7-8 depict alternative embodiments of the invention. The two glass bubble levels 400 (hereinafter levels) are affixed to the legs of the Precision Corner, one of the levels 400 is integrated into the long leg 150 such that the one of the levels 400 is situated in the long leg 150 when the Precision Corner is arranged vertically and faced forward. One of the levels 400 is integrated into the short leg 200 such that the one of the levels 400 is situated in the short leg 200 when the Precision Corner is arranged vertically and faced forward. It shall be noted that the embodiments depicted in FIGS. 7-8, involve differing lengths for the long leg 150.

While various embodiments of the present invention have been described above, it should be understood that they have been presented by way of example only, and not of limitation. Likewise, the various diagrams may depict an example architectural or other configuration for the invention 100, which is done to aid in understanding the features and functionality that can be included in the invention.

The invention 100 is not restricted to the illustrated example architectures or configurations, but the desired features can be implemented using a variety of alternative architectures and configures. Indeed, it will be apparent to one of skill in the art how alternative functional, logical or physical partitioning and configurations can be implemented to implement the desired features of the present invention 100.

Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention 100 is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention 100, whether or not such embodiments are described and whether or not such features are presented as being a part of a described embodiment. Thus the breadth and scope of the present invention 100 should not be limited by any of the above-described exemplary embodiments.

What is claimed is:
1. A tool comprising:
 a Y-shaped corner tool that is adapted for placement against a frame in order to adaptively make measurements and markings in order to aid in subsequent installation of hardware associated with installation of blinds and shades for a window frame or door frame.

2. The corner tool in claim 1, comprised of three legs of different lengths that come together at one 90-degree angle and one 45-degree angle to form the Y-shaped head of the tool; wherein said Y-shaped head is adapted to be held against a left or right edge of said frame in order to make measurements of installation and simultaneously mark the point of installation on an outside or inside edge of said frame.

3. The corner tool in claim 2, wherein the three legs is further defined with a longest leg, a shortest leg, and a medium-length leg; wherein the longest leg intersects with the shortest leg forming a 90-degree angle, and which is adapted to enable placement against a left or right edge of a frame in order to measure and mark the points of installation on either the outside or inside edge of the said frame.

4. The corner tool in claim 3, wherein the medium-length leg intersects with both the shortest leg and the longest leg at a 45-degree angle.

5. The corner tool of claim 4, wherein each of the three legs forming the Y-shaped head contains a plurality of holes; wherein the plurality of holes is evenly-spaced apart, and form a straight line beginning at a center of the Y-shaped head and continuing outwardly towards an edge of each of the three legs; wherein the plurality of holes facilitate said markings being presented on to said frame.

6. The corner tool in claim 5, wherein each of the three legs forming the Y-shaped head contains ruler lines labeled with numbers at every inch-mark.

7. The corner tool in claim 6, wherein each of the plurality of holes is placed along said ruler lines.

8. The corner tool in claim 7, wherein each of the three legs forming the Y-shaped head contains ruler lines labeled with numbers at every ½ mark.

9. The corner tool in claim 8, wherein each of the plurality of holes is placed at each labeled ½ inch mark of each leg.

10. The corner tool in claim 9, wherein at least one glass bubble level is affixed to an exterior top of the shortest leg such that the at least one glass bubble level is at a highest point of the corner tool when said corner tool is arranged vertically.

11. The corner tool in claim 10, wherein, at least one glass bubble level is affixed to an exterior side of the longest leg.

12. The corner tool in claim 11, wherein the short leg includes an "L" marking.

13. The corner tool in claim 12, wherein the shortest leg includes an "R" marking.

14. The corner tool in claim 13, wherein the "L" marking is provided on a first surface; wherein the "R" marking is provided on a second surface; wherein the "L" marking is used to designate left, and correlates with adaptive use with a left corner of the frame; wherein the "R" marking is used to designate right, and correlates with adaptive use with a right corner of the frame.

15. The corner tool in claim 9, wherein at least one glass bubble level is integrated into the long leg such that the at least one glass bubble level is situated in the long leg where the corner tool is arranged vertically and faced forward.

16. The corner tool in claim 15, wherein at least one glass bubble level is integrated into the short leg such that the at least one glass bubble level is situated in the short leg where the corner tool is arranged vertically and faced forward.

17. The corner tool in claim 16, wherein the short leg includes an "L" marking.

18. The corner tool in claim 17, wherein the shortest leg includes an "R" marking.

19. The corner tool in claim 18, wherein the "L" marking is provided on a first surface; wherein the "R" marking is provided on a second surface; wherein the "L" marking is used to designate left, and correlates with adaptive use with a left corner of the frame; wherein the "R" marking is used to designate right, and correlates with adaptive use with a right corner of the frame.

* * * * *